United States Patent

Shelstad et al.

[15] 3,681,805

[45] Aug. 8, 1972

[54] APPARATUS FOR WASHING VEHICLE WHEELS

[72] Inventors: Richard J. Shelstad, Mequon; James A. Ballo, Elm Grove, both of Wis.

[73] Assignee: Edick Industries, Inc., Butler, Wis.

[22] Filed: March 16, 1970

[21] Appl. No.: 19,669

[52] U.S. Cl............15/21 R, 104/172 B, 15/DIG. 2, 134/45
[51] Int. Cl..............................................B60s 3/04
[58] Field of Search.............15/DIG. 2, 21 R, 21 D; 104/172 B; 134/6, 45, 123

[56] References Cited

UNITED STATES PATENTS

| | | | |
|---|---|---|---|
| 2,910,202 | 10/1959 | Clarke et al. | 15/21 R X |
| 2,807,271 | 9/1957 | Spinner, Jr. | 15/21 R X |
| 2,718,650 | 9/1955 | Haverberg | 15/21 R |

*Primary Examiner*—Edward L. Roberts
*Attorney*—John W. Michael, Gerrit D. Foster, Bayard H. Michael, Paul R. Puerner, Joseph A. Gemignani, Andrew O. Riteris, Daniel Van Dyke and Spencer B. Michael

[57] ABSTRACT

A first conveyor means engages one of the front wheels of a vehicle to convey it along a path of travel until it comes to rest at a wheel washing station with the front wheels positioned adjacent a pair of brush units. The front wheels are then washed with the vehicle in a stationary position by spinning the wheels while in contact with the brush units. The first conveyor means then engages one of the rear wheels of the vehicle and conveys it along the path of travel until the vehicle comes to rest with the rear wheels positioned adjacent the brush units. The rear wheels are then washed by spinning them while in contact with the brush units. The vehicle is then conveyed further along the path of travel away from the wheel washing station by a second conveyor means which engages one of the front wheels of the vehicle.

11 Claims, 9 Drawing Figures

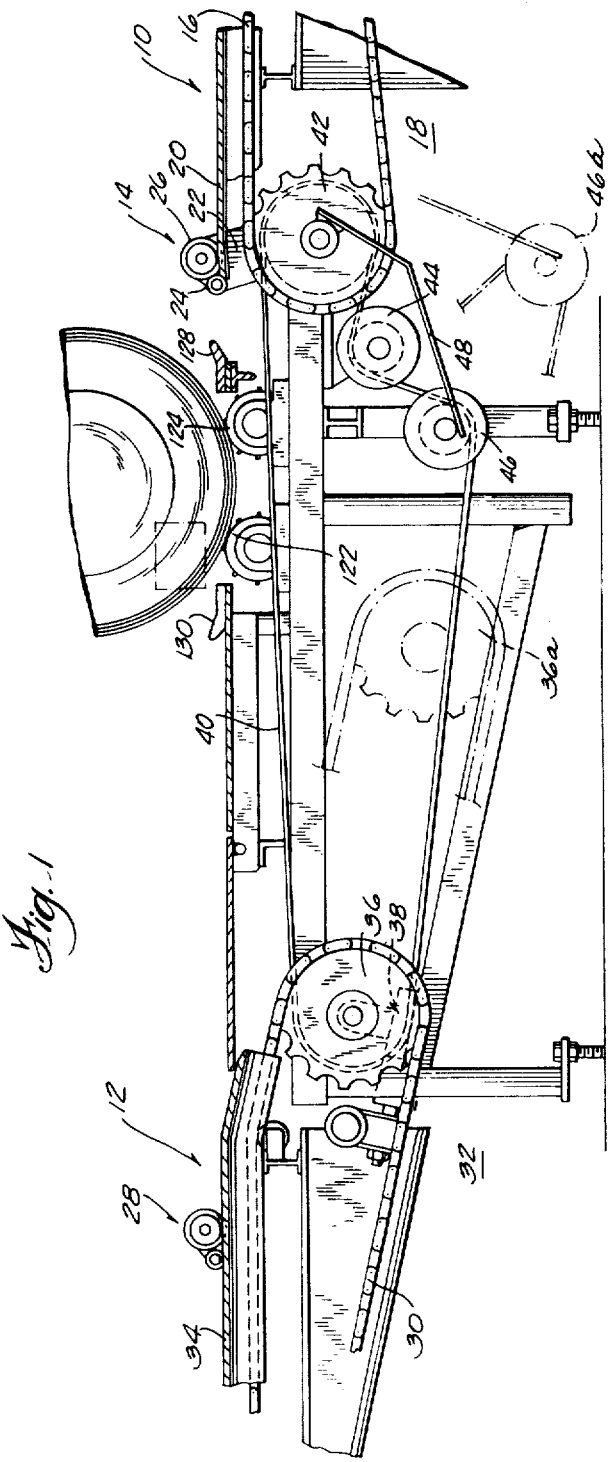

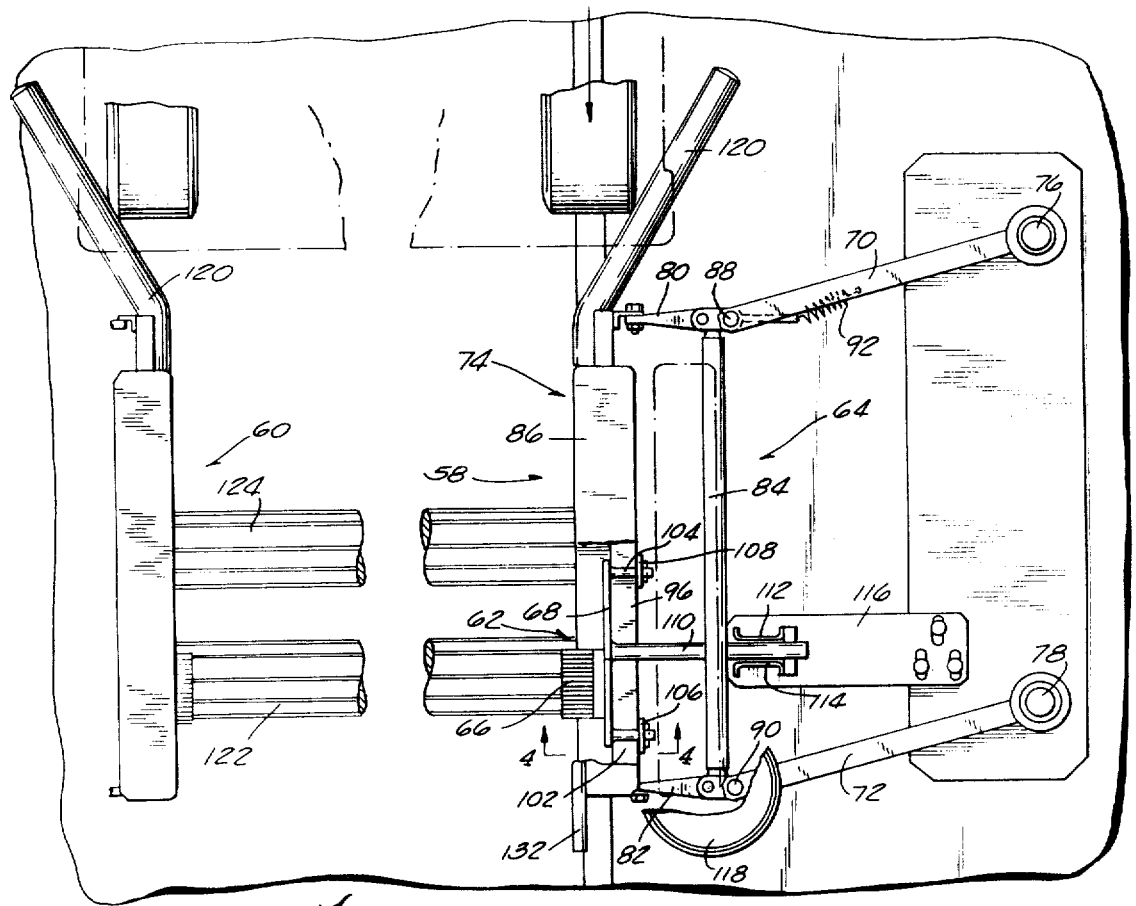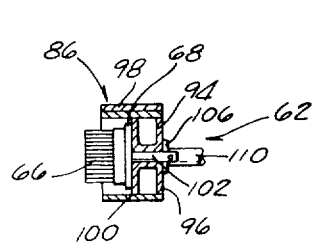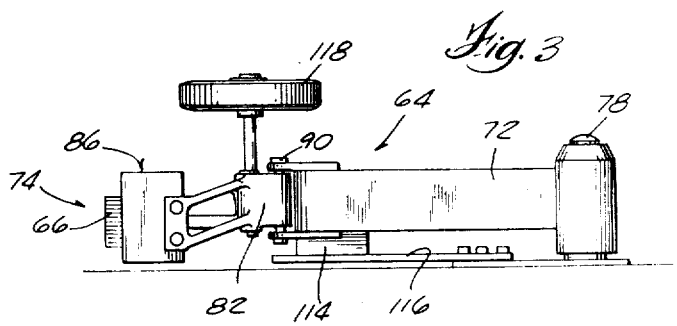

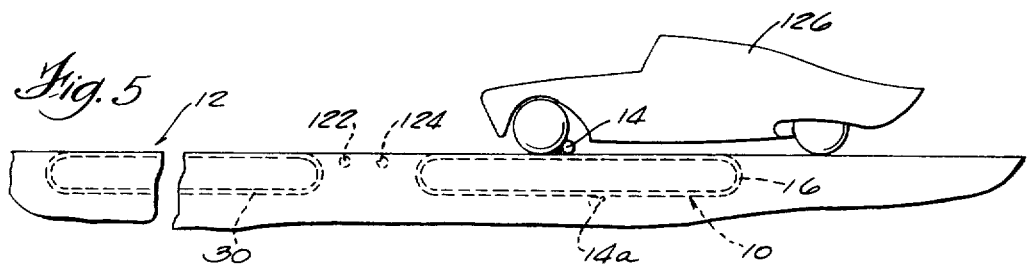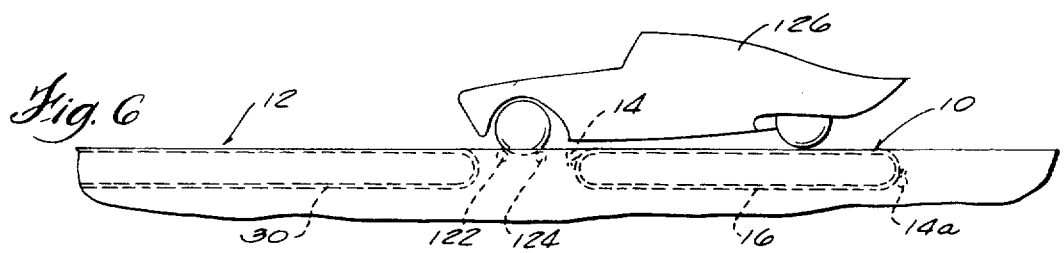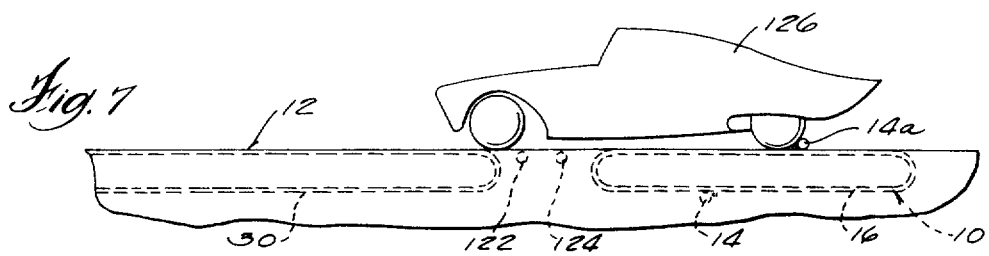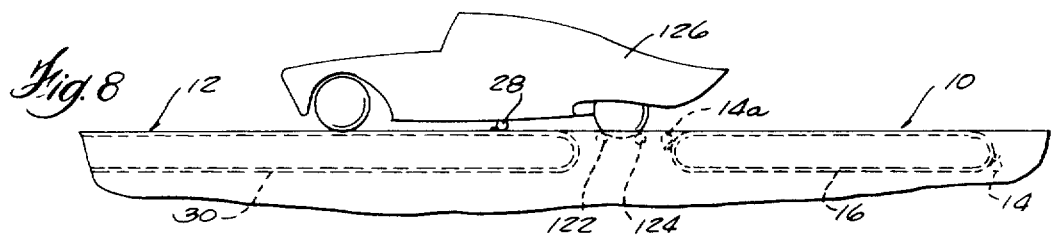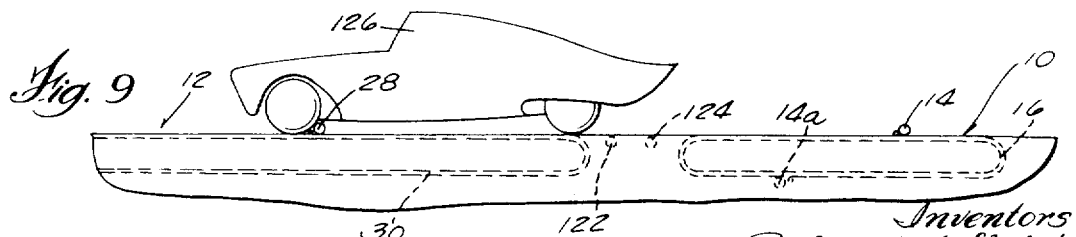

APPARATUS FOR WASHING VEHICLE WHEELS

BACKGROUND OF INVENTION

1. Field of Invention

This invention relates to an apparatus for cleaning the wheels of a vehicle and is particularly adapted for use in an automatic car wash installation.

2. Description of Prior Art

The conventional approach used in automatic car wash installations for washing wheels is to provide some kind of apparatus which makes contact with the sidewalls of the tires as the vehicle is conveyed through the installation. This approach involves the inherent disadvantages of attempting to wash the vehicle wheels as the vehicle itself is moving along the path of travel through the car wash. The object of the present invention is to provide an apparatus wherein the front and rear wheels are washed while the vehicle is temporarily at rest in a stationary position. This arrangement permits a simplified and less expensive washing apparatus, and, at the same time, provides a more thorough washing operation.

SUMMARY OF INVENTION

A first conveyor means adapted for engagement with one of the front wheels will convey the vehicle to a washing station whereby the car will assume a first stationary position with the front wheels positioned for washing by a wheel washing means. The front wheels are then washed by the wheel washing means which includes a pair of brush units which engage the front wheels while the wheels are subjected to a spinning action. The first conveyor means then again engages one of the rear wheels of the vehicle to further convey it to a second stationary position wherein the rear wheels are positioned for washing by the wheel washing means. The rear wheels are then washed while the car is in the second stationary position after which a second conveyor means adapted for engagement with one of the front wheels of the vehicle conveys the vehicle away from the washing station. The operation of the first and second conveyor means is synchronized to provide the proper time periods for washing the front and rear wheels respectively.

DESCRIPTION OF DRAWINGS

FIG. 1 is a fragmentary side elevation view showing conveyor apparatus employed in the present invention;

FIG. 2 is a fragmentary top plan view of the wheel washing apparatus employed in the present invention;

FIG. 3 is a front elevation view of the apparatus shown in FIG. 2;

FIG. 4 is a sectional view taken along line 4—4 of FIG. 2; and

FIGS. 5–9 inclusive are partially schematic views showing an automobile in successive positions as it passes through the wheel washing apparatus.

DESCRIPTION OF PREFERRED EMBODIMENT

The apparatus of this invention is particularly designed for installation in a so-called "automatic car wash" wherein a car is washed by a series of automatically controlled washing and drying operations as it passes through the installation.

While the apparatus of this invention is particularly designed for cleaning the side walls of a car's tires, such invention could be used with most any type of wheeled vehicle. Accordingly, in the description and claims that follow, the terms "wheel" and "tire" are in some instances used interchangeably.

The conveyor apparatus (FIG. 1) and the wheel and tire washing apparatus (FIGS. 2, 3 and 4) cooperate in a particular manner described hereinafter to produce the desired results.

Referring first to the conveyor apparatus shown in FIG. 1, such apparatus is comprised of a first or entrance conveyor mechanism 10 and a second or exit conveyor mechanism 12 which operates to move an automobile or other wheeled vehicle along a predetermined path. The entrance mechanism 10 is preferably located at the entrance to the automatic car wash installation and includes at least one drive unit assembly 14 operatively connected to a conveyor drive chain 16.

Chain 16 is mounted in a trench 18 for movement at an elevation below the level of a first tire supporting surface 20 on which the car rolls as it enters the car wash installation.

Each drive unit 14 is comprised of a centrally located trolley frame 22 which is operatively connected to the drive chain 16 by any suitable arrangement. Each drive unit 14 further includes pairs of tire engaging rollers 24 and 26. The particular construction and operation of drive units 14 and its associated conveyor mechanism is described in detail in application, Ser. No. 770,327 filed Oct. 24, 1968 and thus will not be described in detail herein.

The exit conveyor mechanism 12 is located adjacent the entrance mechanism 10 in line therewith along the path of travel and includes a plurality of drive unit assemblies 28 operatively connected to a conveyor drive chain 30. Chain 30 is mounted in a trench 32 for movement at an elevation below the level of a second tire supporting surface 34. The construction and operation of drive assemblies 14 and 28 are identical.

Entrance and exit conveyor mechanisms 10 and 12 are preferably driven from a common source of mechanical power. In the preferred embodiment shown in FIG. 1, the prime mover (not shown) for driving both conveyors is located at the exit end of the exit conveyor 12 and operates to directly drive chain 30. Chain 30 is mounted at its right-hand end as viewed in the drawings on a sprocket means 36, the position of which can be adjusted by a take-up mechanism 38 to compensate for variation in the length of chain 30 which occurs over its operational life. The maximum take-up position of sprocket means 36 is shown in dotted lines and is identified by the reference numeral 36a.

Power is transmitted to conveyor chain 16 by a coupler claim 40 which is mounted on its left-hand end (as shown in FIG. 1) on sprocket means 36 and on its right-hand end on a sprocket means 42. The entrance conveyor chain 16 is mounted on sprocket means 42 and is thus driven by coupler chain 40 in synchronized relationship with exit conveyor chain 30. A pair of idler sprockets 44 and 46 are provided for coupler chain 40. Sprocket 44 is mounted on a stationary support and sprocket 46 is mounted on the end of a take-up arm 48 which is pivotally supported on its upper end so that as sprocket means 36 is adjusted to the right to take-up on conveyor chain 30, sprocket 46 will swing downwardly to provide a corresponding amount of take-up in coupler chain 40. Sprocket 46 on arm 48 swings downwardly by the force of gravity so that the take-up adjustment of chain 40 occurs automatically. The maximum take-up position of sprocket 46 is shown in dotted lines and is identified by the reference numeral 46a.

From the foregoing, it is seen that the drive means for both chains 16 and 30 are in effect connected to each other so that the movement of one drive chain will at all times be synchronized with the movement of the other drive chain. As will be explained hereinafter, it is important to the proper operation of the wheel and tire washing apparatus of this invention that the first and second conveyor mechanisms 10 and 12 be synchronized one with the other.

The wheel and tire washing apparatus (FIGS. 2, 3 and 4) is comprised of a pair of movable washing units 58 and 60 mounted on opposite sides of the travel path of the car. Since the construction and operation of units 58 and 60 are substantially identical only one unit 58 will be described in detail herein.

Unit 58 is comprised of a movable brush assembly 62 and a brush actuating assembly 64 adapted to move the cleaning brush towards and away from the tire in response to movement of the car on the conveyor. Brush assembly 62 is comprised of a brush member 66 preferably comprised of stainless steel bristles mounted on a support plate 68 as best shown in FIG. 4.

Actuating assembly 64 is comprised of a pair of pivotally mounted support arms 70 and 72 and a tire engaging assembly 74 mounted on the ends of arms 70, 72 as best shown in FIG. 2. Support arms 70, 72 are pivotally mounted on the floor by pivot pins 76, 78 and are adapted for movement in a horizontal plane. Assembly 74 is comprised of a pair of support brackets 80 and 82 rigidly fastened to a rod member 84 and a tire engaging assembly 86. Member 84 and assembly 86 together with brackets 80 and 82 form a rigid rectangular structure which moves as a unit. Brackets 80 and 82 are connected to arms 70 and 72 by pivot pins 88, 90. The arms are biased to swing inwardly towards the car wheels by a spring 92.

As shown in FIG. 4, brush member 66 of brush assembly 62 is slidably mounted in tire engaging assembly 86 by means of a pair of channel members 94, 96 welded or otherwise fastened to top and bottom plates 98, 100 of assembly 86. Brush support plate 68 is held in place for sliding engagement with channels 94, 96 by a pair of pins 102, 104 which are fastened to plate 68 and extend between channels 94,96 and are held in assembled position by retaining washers 106,108.

A guide rod 110 for the brush unit 66 is fastened to the back side of plate 68 and extends between a pair of stationary guide members 112 and 114 as shown in FIG. 2. Guide members 112 and 114 are in turn mounted on a mounting plate 116 which is fastened to the floor.

The unit 58 is provided with a bumper wheel 118 to protect against any possible contact between the brush unit and the car body. An angled tire engaging rod 120 welded or otherwise fastened to unit 74 is provided to produce the initial actuation of the unit by the moving car.

A pair of wheel spinning rollers 122 and 124 are provided at the tire washing station. At least one of such rollers (preferably roller 122) is connected to a prime mover (not shown) such as an electric or hydraulic motor so that when the wheels of the car come to rest between the rollers the wheels can be rotated while in contact with the cleaning brushes. An inclined transfer plate 128 and in inclined over-roll plate 130 are provided to insure proper positioning of the car wheels between rollers 122 and 124. A guard bar 132 is provided on the exit end of assembly 74 to prevent any possibility of damage to the tire valve stems as the wheels move out of the wheel washing station.

OPERATION

As shown in FIG. 5, a car 126 is driven onto first or entrance conveyor 10 where a drive unit assembly 14 moves into contact with the rear portion of the left front tire on the car.

The car is then conveyed from the position shown in FIG. 5 to the position shown in FIG. 6. In the FIG. 6 position, the two front tires of the car will come to rest between wheel spinning rollers 122 and 124, in which position the drive unit assembly 14 will have become disengaged with the car tire, thus allowing the car to remain stationary with respect to the conveyor. As the car moves into the FIG. 6 position, it will be aided in its forward movement by an inclined transfer plate 128 as shown in FIG. 1 to transfer the car from the drive unit 14 to the rollers 122, 124 and thereby insure movement of the vehicle into the wheel washing station. Also provided is an inclined over-roll plate 130 located at the exit of the wheel washing station to prevent the vehicle from rolling past the rollers 122, 124 as it moves into the wheel washing station by the action of transfer plate 128.

The forward movement of the front wheels of the car into the FIG. 6 position will cause the front tires to make contact with the tire engaging rods 120 of tire washing units 58 and 60. Such engagement will cause the units to swing forwardly and outwardly away from the path of travel, thus allowing the tires to move into engagement with the washing brushes 66. As will be appreciated from a review of FIGS. 2–4, as the washing units are swung forwardly and away from the car, brush units 62 will move at right angles to the path of travel away from the path along which the car is moving. This outward movement of brush units 62 is guided by the action of guide rod 110 as it moves through guide brackets 112 and 114. The force exerted on brush unit 62 which produces the retracting action is provided by the sliding engagement between plate 68 and channel members 94, 96 which parts as previously explained are held in proper engagement by pins 102, 104 and retaining washers 106, 108.

Thus, it is seen that as washing units 58 and 60 are moved forwardly and outwardly by the moving car, brushes 66 will be retracted to a position for ultimate engagement with the tires when the car reaches the FIG. 6 position. Thus, when the car reaches the FIG. 6 position, brushes 66 will be in contact with the sidewalls of the tires and biased into such engagement by the action of spring 92. A thorough washing of the tires will then take place due to the rotation of the tires on rollers 122, 124 while in engagement with the brushes. In the preferred embodiment, the second roller 122 is rotated continuously during the car washing operation. It will be appreciated that during the tire washing operation the car itself will be in a stationary position with respect to the conveyor mechanism of the automatic car wash.

The cleaning operation on the front tires will continue for as long as the car remains in the FIG. 6 position. This period of time will be determined by the time it takes the second drive unit 14a on the first conveyor to move into driving engagement with the left rear wheel of the car as shown in FIG. 7. As soon as the drive unit 14a moves into engagement with the rear wheel as shown in FIG. 7, the car will be moved forwardly from the FIG. 6 position to the FIG. 8 position. As the car is moved forwardly out of the FIG. 6 position, washing units 58, 60 will pivot rearwardly back to the FIG. 2 position by the action of the return springs 92. It will be appreciated that as the car moves out of the FIG. 6 position, rotating roller 122 will continue to spin the wheels until the wheels loose contact with the roller. Guard bar 132 will prevent any possibility of damage to the tire valve stems due to contact with assembly 74 during this period.

In the FIG. 8 position, the rear tires will become positioned between the wheel spinning rollers 122, 124 and the drive unit 14a of the first conveyor will move out of engagement with the car tire and the car will then assume a stationary position with respect to the conveyors.

The rear tires will then be cleaned as they are rotated by rollers 122, 124 while the tires are in engagement with the brushes 66 which action of the washing units 58, 60 with respect to the tires is the same as that described above with respect to the front tires.

The washing of the rear tires will continue for as long as the car remains in the FIG. 8 position, which period of time will depend on the time it takes for a drive unit 28 on exit conveyor 12 to move into driving engagement with the left front tire of the car as shown in FIG. 9. As shown in FIG. 9, as soon as the drive unit 28 of the second conveyor makes contact with the front tire of the car, the car will be again conveyed in the forward direction, causing the rear wheels to move forwardly out of the wheel washing station. The car will then be conveyed through the remaining portion of the automatic car wash installation.

It will be appreciated from the foregoing that it is important that a particular sequence of engagement of drive units 14 and 28 with the front and rear tires of the car be maintained so that sufficient dwell periods are provided for thorough washing of the car tires. Such sequence of engagement is provided by proper synchronization of conveyors 10 and 12 as previously explained. In the preferred embodiment, the entrance and exit conveyors 10 and 12 are driven at the same speed and the spring between drive units 14 on conveyor 10 and drive units 28 on conveyor 12 are identical.

We claim:

1. Wheel washing apparatus for vehicles comprising:
   a wheel washing means adapted for washing the wheels of a vehicle while the vehicle is in a stationary position at a wheel washing station;
   a first conveyor means for conveying the vehicle to the washing station whereby the vehicle will assume a first stationary position with the front wheels thereof positioned for washing by said wheel washing means, said first conveyor means further adapted to further convey the vehicle after a period of time during which the front wheels are washed by said washing means whereby the vehicle will assume a second stationary position with the rear wheels thereof positioned for washing by said wheel washing means; and
   a second conveyor means for conveying the vehicle away from the washing station, said second conveyor means adapted to convey the vehicle after a period of time during which the rear wheels are washed by said washing means.

2. A wheel washing apparatus according to claim 1 in which said wheel washing means includes a pair of movable brush units adapted for engagement with the vehicle wheels when the vehicle is in its first and second stationary positions; said wheel washing means further including a wheel spinning means adapted to spin each pair of wheels while in engagement with said brush units.

3. A wheel washing apparatus according to claim 2 in which said wheel spinning means is comprised of a pair of rollers between which the wheels come to rest at the wheel washing station, at least one of said rollers being driven by a source of mechanical power.

4. A wheel washing apparatus according to claim 1 in which said wheel washing means further includes a brush actuating means adapted to move said brush units in response to movement of the vehicle by said first and second conveyor means.

5. A wheel washing apparatus according to claim 4 in which said brush actuating means includes a pair of pivotally mounted support arms and a wheel engaging assembly mounted on said arms, said wheel engaging assembly adapted for actuation by the vehicle wheels as the vehicle is conveyed by said first and second conveyor means.

6. A wheel washing apparatus according to claim 1 in which said first conveyor means includes a drive unit means adapted for engagement with at least one front wheel of the vehicle to convey it to the washing station for washing of the front wheels, said drive unit means further adapted for subsequent engagement with at least one rear wheel of the vehicle to convey it further along the path of travel for washing of the rear wheels.

7. A wheel washing apparatus according to claim 6 in which said first conveyor means includes an inclined transfer plate located at the entrance to the wheel washing station and adapted to insure movement of the vehicle into the wheel washing station.

8. A wheel washing apparatus according to claim 7 in which said first conveyor means further includes an inclined over-roll plate located at the exit of the wheel washing station and adapted to prevent the vehicle from rolling through the wheel washing station.

9. A wheel washing apparatus according to claim 1 in which said second conveyor means includes a drive unit means adapted for engagement with at least one front wheel of the vehicle to convey it away from the washing station after the rear wheels have been washed.

10. A wheel washing apparatus according to claim 1 in which the movement of said first conveyor means is synchronized with the movement of said second conveyor means.

11. A wheel washing apparatus according to claim 10 in which said first and second conveyor means are driven from the same prime mover.

* * * * *